United States Patent
Heverly, II et al.

(10) Patent No.: US 9,745,055 B2
(45) Date of Patent: Aug. 29, 2017

(54) ACTIVE VIBRATION ISOLATION WITH DIRECT FLUID ACTUATION

(71) Applicant: Bell Helicopter Textron Inc., Fort Worth, TX (US)

(72) Inventors: David E. Heverly, II, Arlington, TX (US); Taeoh Lee, Keller, TX (US); Michael R. Smith, Colleyville, TX (US); James E. Wright, Downingtown, PA (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 14/666,574

(22) Filed: Mar. 24, 2015

(65) Prior Publication Data
US 2016/0280363 A1     Sep. 29, 2016

(51) Int. Cl.
  *F16F 9/10* (2006.01)
  *B64C 27/00* (2006.01)
  *F16F 9/504* (2006.01)

(52) U.S. Cl.
  CPC .............. *B64C 27/001* (2013.01); *F16F 9/10* (2013.01); *F16F 9/504* (2013.01); *B64C 2027/002* (2013.01); *B64C 2027/004* (2013.01); *F16F 2222/08* (2013.01); *F16F 2238/04* (2013.01)

(58) Field of Classification Search
  CPC .. F16F 7/1034; F16F 9/43; F16F 9/504; F16F 9/10; F16F 15/023; F16F 2222/08; B64C 27/001; B64C 2027/002; B64C 2027/004
  See application file for complete search history.

(56) References Cited

U.S. PATENT DOCUMENTS

| | | | | |
|---|---|---|---|---|
| 3,477,665 A | * | 11/1969 | Legrand | B64C 27/001 188/266.2 |
| 3,690,607 A | * | 9/1972 | Kenneth | B64C 27/001 188/382 |
| 3,701,499 A | * | 10/1972 | Schubert | B64C 27/001 188/1.11 E |
| 3,836,098 A | * | 9/1974 | Miyashita | B64C 27/001 188/380 |
| 4,796,873 A | * | 1/1989 | Schubert | G05D 19/02 248/550 |
| 2006/0175166 A1 | * | 8/2006 | Fischer | B60G 17/056 188/322.13 |
| 2011/0316207 A1 | * | 12/2011 | Smith | B64C 27/001 267/140.15 |
| 2015/0060595 A1 | * | 3/2015 | Plummer | B64C 27/001 244/17.11 |

* cited by examiner

*Primary Examiner* — Anna Momper (57) ABSTRACT

A method of isolating vibrations between vibrating bodies includes determining a pressure differential between a first fluid chamber and a second fluid chamber of a liquid inertia vibration eliminator (LIVE) unit, and selectively injecting fluid into or withdrawing fluid from the LIVE unit based on the pressure differential. A system for isolating vibrations between bodies includes a vibration isolator including fluid, a fluid regulator valve in fluid communication with the vibration isolator to selectively flow fluid through the vibration isolator, a pressurized fluid source in fluid communication with the fluid regulator to supply fluid to the fluid regulator, a controller in signal communication with the fluid regulator to control fluid flow between the fluid regulation valve and the vibration isolator, and at least one sensor in signal communication with the controller.

33 Claims, 11 Drawing Sheets

ACTIVE VIBRATION ISOLATION WITH DIRECT FLUID ACTUATION

TECHNICAL FIELD

This disclosure relates to vibration isolation systems, for example, rotorcraft vibration isolation systems.

BACKGROUND

Different rotorcraft bodies experience different levels of vibration. For example, a rotor system of a rotorcraft experiences periodic vibration due to the rotation of a rotor, while a fuselage of the rotorcraft experiences relatively lesser vibration. A vibration isolation system is used in rotorcrafts such as helicopters and tiltrotor aircrafts to damp or isolate vibrations between two bodies of a rotorcraft, for example, between the rotor system and the fuselage. A vibration isolation system sometimes includes one or more liquid inertia vibration eliminator (LIVE™) units connecting two bodies of a rotorcraft to reduce or cancel transmissibility of vibration between the two bodies. Sometimes, LIVE™ units can be characterized as passive LIVE™ units or active LIVE™ units.

SUMMARY

This disclosure describes isolating vibrations between vibrating bodies.

In some aspects, a method of isolating vibrations between vibrating bodies includes determining a pressure differential between a first fluid chamber and a second fluid chamber of a liquid inertia vibration eliminator (LIVE™) unit, and selectively injecting fluid into or withdrawing fluid from the LIVE™ unit based on the pressure differential.

This, and other aspects, can include one or more of the following features. Selectively injecting fluid into or withdrawing fluid from the LIVE™ unit based on the pressure differential can include injecting a quantity of fluid into the first fluid chamber based on the pressure differential, and the method can include withdrawing the same quantity of fluid from the second fluid chamber. Selectively injecting fluid into or withdrawing fluid from the LIVE™ unit based on the pressure differential can include injecting a quantity of fluid into the second fluid chamber based on the pressure differential, and the method can include withdrawing the same quantity of fluid from the first fluid chamber. Injecting a quantity of fluid into the second fluid chamber based on the pressure differential can include injecting the quantity of fluid into the second fluid chamber at a predetermined time based on the pressure differential. A first portion of the LIVE™ unit can be attached to a first vibrating body, a second portion of the LIVE™ unit can be attached to a second vibrating body, and the first vibrating body can be more stable relative to the second vibrating body, and determining the pressure differential between the first fluid chamber and the second fluid chamber can include measuring a movement of the first body, measuring a movement of the second body, determining a difference between the movement of the first body and the movement of the second body, and determining the pressure differential based on the determined difference between the movement of the first moving body and the movement of the second moving body. The movement of the first body can include an acceleration of the first body and the movement of the second body can include an acceleration of the second moving body. Selectively injecting fluid into or withdrawing fluid from the LIVE™ unit can include selectively flowing fluid through the LIVE™ unit with a fluid regulator connected to the LIVE™ unit. Selectively injecting fluid into or withdrawing fluid from the LIVE™ unit can include providing a control signal from a controller to the fluid regulator to selectively flow fluid through the LIVE™ unit. A first portion of the LIVE™ unit can be attached to a first vibrating body and a second portion of the LIVE™ unit can be attached to a second vibrating body, and providing a control signal from a controller to the fluid regulator can include generating a control signal based on the major harmonics of the primary disturbance frequency of the first and second vibrating bodies. A first portion of the LIVE™ unit can be attached to a first vibrating body and a second portion of the LIVE™ unit can be attached to a second vibrating body, and providing a control signal from a controller to the fluid regulator can include generating a control signal based on a feedback signal output of a sensor connected to at least one of the first vibrating body or the second vibrating body. Selectively flowing fluid through the LIVE™ unit with a fluid regulator connected to the LIVE™ unit can include selectively flowing fluid through the LIVE™ unit with a servo valve connected to the LIVE™ unit. The method can include maintaining a fluid source including fluid under a constant pressure, and selectively injecting or withdrawing the fluid into the LIVE™ unit can include regulating flow of the fluid between the fluid source and the LIVE™ unit with a fluid regulator. Maintaining a fluid source including fluid under constant pressure can include receiving, with the fluid source, fluid at a first pressure from the fluid regulator and supplying, with the fluid source, fluid at a second, higher pressure to the fluid regulator. The method can include regulating flow of fluid between the fluid source and a second LIVE™ unit with a second fluid regulator.

Some aspects of the subject matter described herein can include a system for isolating vibrations between bodies. The system includes a vibration isolator including fluid, a fluid regulator valve in fluid communication with the vibration isolator to selectively flow fluid through the vibration isolator, a pressurized fluid source in fluid communication with the fluid regulator to supply fluid to the fluid regulator, a controller in signal communication with the fluid regulator to control fluid flow between the fluid regulation valve and the vibration isolator, and at least one sensor in signal communication with the controller.

This, and other aspects, can include one or more of the following features. The vibration isolator can include a liquid inertia vibration eliminator (LIVE™) unit, where the LIVE™ unit includes a first fluid chamber, a second fluid chamber, and a port connecting the first chamber and the second chamber, and where the first chamber, second chamber, and the connecting port define a volume occupied by the fluid. The pressurized fluid source can receive fluid at a first pressure from the fluid regulator and supply fluid at a second, higher pressure to the fluid regulator. The system can include a fluid accumulator to maintain the fluid under a constant pressure. The system can include a heat exchanger to modify a temperature of the fluid. The system can include a second vibration isolator in fluid communication with a second fluid regulator, where the pressurized fluid source is in fluid communication with the second fluid regulator to supply fluid to the second fluid regulator. The system can include a first sensor associated with the first mentioned vibration isolator and in signal communication with the controller, and a second sensor associated with the second vibration isolator and in signal communication with the controller.

Some aspects of the subject matter described herein can include a system for isolating vibration between bodies. The system includes vibration isolator including a first chamber, a second chamber, and a port connecting the first chamber and the second chamber, where the first chamber, the second chamber and the port define a volume occupied by a fluid, and a fluid regulator connected to the vibration isolator, where the fluid regulator selectively flows fluid through the vibration isolator based on a pressure differential between the first chamber and the second chamber.

This, and other aspects, can include one or more of the following features. The system can include fluid passageways between the fluid regulator and the vibration isolator to communicate fluid between the fluid regulator and the first chamber through a first fluid passageway and between the fluid regulator and the second chamber through a second fluid passageway. The fluid regulator can be configured to inject a quantity of fluid into the first chamber based on the pressure differential and withdraw the same quantity of fluid from the second chamber. The fluid regulator can be configured to inject a quantity of fluid into the second chamber based on the pressure differential and withdraw the same quantity of fluid from the first chamber. The system can include a controller connected to the vibration isolator and the fluid regulator, with the controller configured to perform operations including determining the pressure differential between the first chamber and the second chamber of the vibration isolator, and providing a control signal to the fluid regulator to selectively flow a quantity of the fluid through the vibration isolator based on the pressure differential. The vibration isolator can include a first portion attached to a first moving body and a second portion attached to a second moving body, where the first moving body is more stable relative to the second moving body, and where determining the pressure differential between the first chamber and the second chamber of the vibration isolator can include determining the pressure differential between the first chamber and the second chamber at a frequency greater than or equal to a vibration isolation frequency between the first moving body and the second moving body. The system can include a fluid source including tuning fluid under pressure and fluidly connected to the fluid regulator. The fluid source can be fluidly connected to a second fluid regulator connected to a second vibration isolator. The system can include a fluid accumulator fluidly connected to the fluid source and the fluid regulator, the fluid accumulator to maintain the fluid under a constant pressure. The system can include a heat exchanger positioned in a return fluid line connecting the fluid regulator and the fluid source, the heat exchanger to modify a temperature of the fluid flowed from the fluid regulator to the fluid source. The vibration isolator can include a liquid inertia vibration eliminator (LIVE™) unit. The fluid regulator can be selected from the group consisting of a servo valve, a direct drive valve, and a rotary direct drive valve.

Some aspects of the subject matter described herein can be implemented as a controller including a non-transitory computer-readable storage storing instructions, and processing circuitry connected to the computer-readable storage. The processing circuitry executes the instructions to perform operations including measuring a movement of a first moving body, measuring a movement of a second moving body connected to the first moving body by a liquid inertia vibration eliminator (LIVE™) unit, the LIVE™ unit including a first chamber, a second chamber, a first portion attached to the first moving body, and a second portion attached to the second moving body, determining a difference between the movement of the first moving body and the movement of the second moving body, and determining a pressure differential between the first chamber and the second chamber of the LIVE™ unit based on the determined difference between the movement of the first moving body and the movement of the second moving body.

This, and other aspects, can include one or more of the following features. The operations can include providing a command signal to a flow regulator connected to the LIVE™ unit to regulate tuning fluid flow through the LIVE™ unit based on the determined pressure differential. The operations can include determining a dominant frequency of the movement of the first moving body or the second moving body.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes active vibration isolation with direct fluid flow activation, for example, in rotorcraft vibration isolation systems between vibratory bodies. A vibration isolation system attenuates, isolates, or otherwise reduces transfer of vibration (e.g., periodic vibration) between two or more bodies. For example, an active vibration isolation system isolates a vibrating body, such as an engine, from transmitting its vibrations to another body. Active vibration isolation includes active adjustment of the isolation frequency and the frequency response characteristics of a vibration isolation system. For example, a pressure differential in the LIVE™ unit can be actively adjusted to affect the isolation frequency and frequency response characteristics of a vibration isolation system. A vibration isolation system includes a vibration isolator (e.g., LIVE™ unit) and a fluid regulator (e.g., servo valve) to regulate direct fluid flow through the vibration isolator. An active vibration isolation system with direct fluid flow activation includes a fluid that functions as both a tuning fluid for the vibration isolator and an actuation fluid for the fluid regulator. An active vibration isolation system can also include a pressurized fluid source to provide fluid to the fluid regulator, and a controller connected to feedback sensors (e.g., vibration sensors) to provide signals to the controller. Conventionally, active vibration isolation systems include one or more vibration isolators with a servo valve and a pumper unit between the vibration isolator and the fluid regulator. The pumper unit transmits hydraulic motion of actuator fluid in the servo valve into hydraulic motion of tuning fluid in the vibration isolator, while keeping separate the tuning fluid and the actuator fluid. However, active vibration isolation systems according to the present disclosure excludes a pumper unit between the vibration isolator and the fluid regulator.

In some implementations, aircraft such as helicopters and rotorcrafts can implement active vibration isolation systems to isolate a fuselage or other portions of an aircraft from mechanical vibrations (e.g., harmonic vibrations) associated with propulsion system components (e.g., engine, transmission, propellers, gearbox, and/or other). For example, rotorcraft vibrations of concern include a blade passage frequency, among others. In some instances, a rotorcraft operates at a constant rotor speed, so the corresponding blade passage frequency is substantially constant. Passive vibration isolators, by design, are effective at a constant vibration frequency that coincides with the designed isolation (tuning) frequency. However, in certain instances, a rotorcraft operates at varying (i.e., not constant) rotor speeds, so the corresponding blade passage frequency is not constant. An active vibration isolation system can be effective over a range of frequencies to accommodate more than just a specific isolation frequency. In other words, the dynamic response characteristics of an active vibration isolation system can be tuned as desired.

Figure 1:
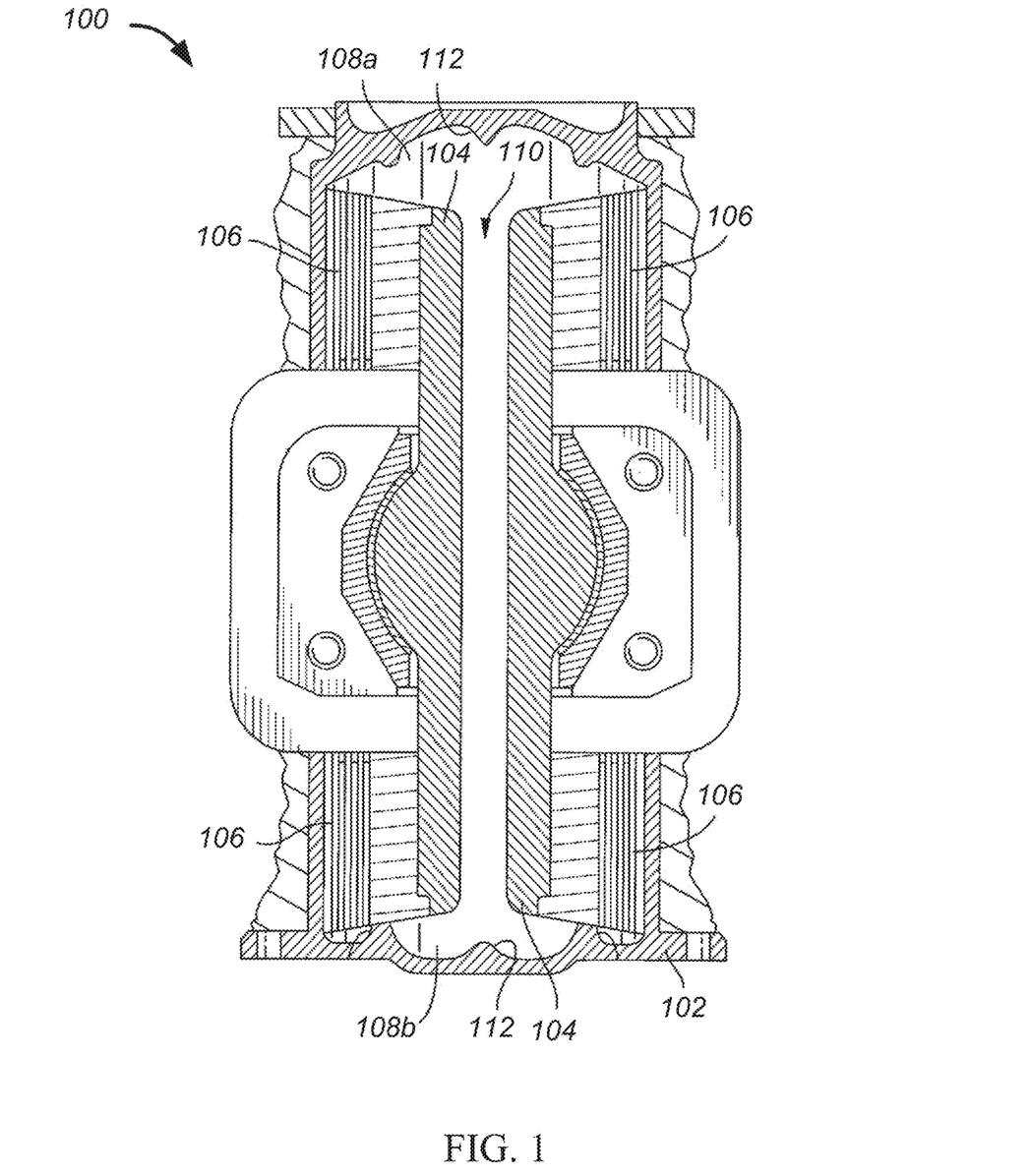
FIG. 1 is a cross-sectional side view of an example LIVE™ unit.

In some implementations, an example vibration isolator includes a LIVE™ unit connecting two moving bodies (e.g., vibratory bodies and/or surfaces). LIVE™ units are vibration-cancelling throughput components, and can take many forms. FIG. 1 is a cross-sectional side view of an example LIVE™ unit 100 that can be used in vibration isolation systems. The example LIVE™ unit 100 includes a housing 102 that has a hollow, generally cylindrical interior. A piston 104 of a selected cross-sectional diameter is disposed within the interior of the housing 102. An elastomeric seal and spring member 106 resiliently seals the piston 104 within the interior of the housing 102. A first fluid chamber 108a and a second fluid chamber 108b are defined by the interior of the housing 102 and the piston 104, and are sealed against leakage by the elastomeric seal and spring member 106. Tuning fluid (e.g., high-density, low-viscosity fluid) is disposed within the fluid chambers 108a and 108b. In addition to sealing the tuning fluid in fluid chambers 108a and 108b, the elastomeric seal and spring member 106 functions as a spring to permit the piston 104 to move or oscillate (e.g., longitudinally move or oscillate) relative to the housing 102, while maintaining the piston 104 in a central location in the housing 102 when no load is applied. A tuning port 110 extends centrally through the piston 104 and permits the tuning fluid to flow between the first fluid chamber 108a and the second fluid chamber 108b (i.e., from the first fluid chamber 108a to the second fluid chamber 108b, and vice versa). In some implementations, a conical flow diverter 112 is provided at each end of the housing 102 and is aligned with and generally opposes an opening at each end of the tuning port 110. Each conical flow diverter 112 enhances fluid flow by decelerating the tuning fluid as it flows between the fluid chambers 108a and 108b into and out of the port 110, thereby reducing eddy currents in the fluid that can result in increased damping. Increased damping can degrade the performance of a vibration isolator resulting in increased vibration transmitted to the isolated body.

Figure 2:
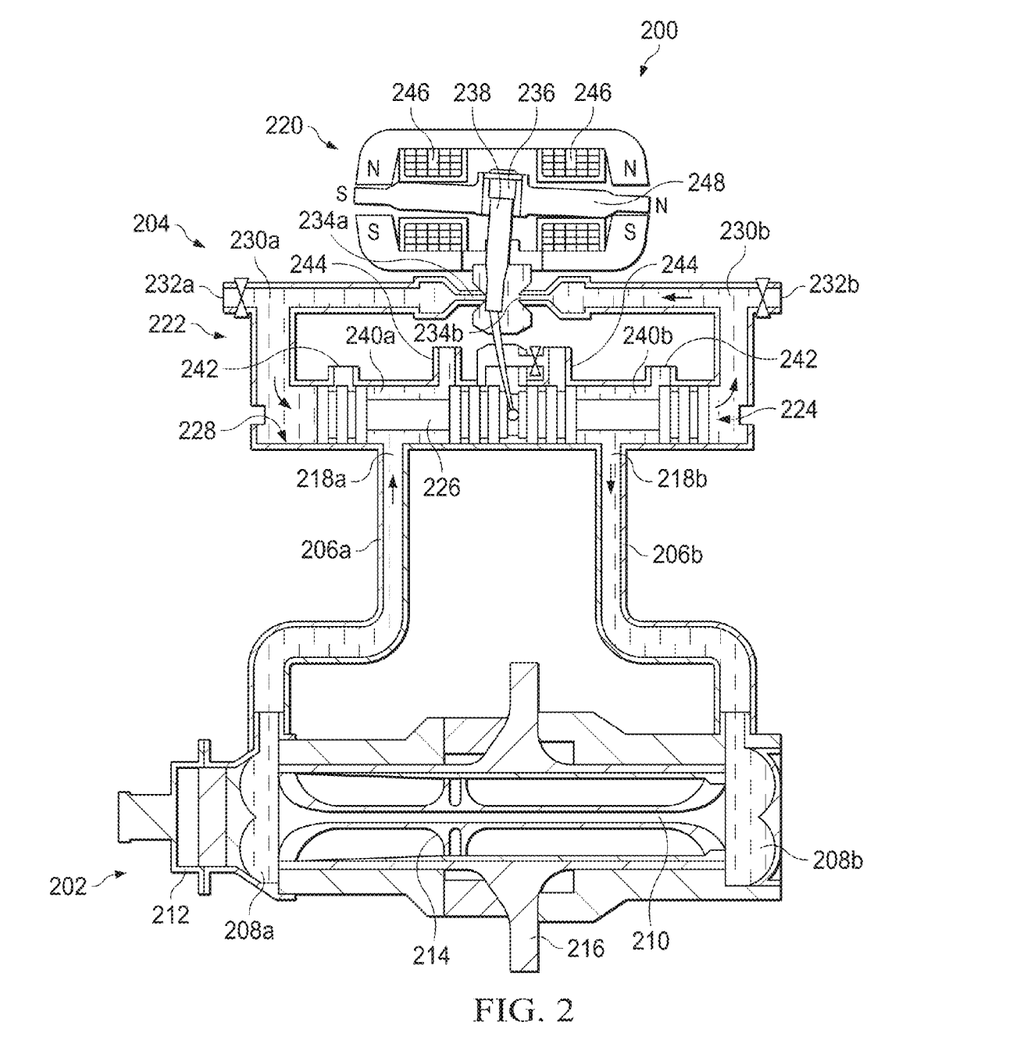
FIG. 2 is a cross-sectional front view of an example active vibration isolation system.

FIG. 2 is a cross-sectional front view of an example active vibration isolation system 200 that includes a LIVE™ unit 202 (e.g., LIVE™ unit 100 of FIG. 1), a fluid regulator including a servo valve 204, and fluid passageways 206a and 206b connecting the LIVE™ unit 202 and the servo valve 204. The fluid passageways 206a and 206b communicate tuning fluid between the LIVE™ unit 202 and the servo valve 204. Actuation of the servo valve 204 selectively flows tuning fluid through the LIVE™ unit 202 via the fluid passageways 206a and 206b. The LIVE™ unit 202 includes a first fluid chamber 208a, a second fluid chamber 208b, a tuning port 210 connecting the first fluid chamber 208a and second fluid chamber 208b, a housing 212 defining the first fluid chamber 208a and the second fluid chamber 208b, and a piston 214 defining the port 210 connecting the first fluid chamber 208a and the second fluid chamber 208b. The first chamber 208a, the second chamber 208b, and the port 210 define a volume of the LIVE™ unit 202 occupied by a fluid (i.e., tuning fluid). The first fluid passageway 206a fluidly couples a first servo valve outlet 218a to the first chamber 208a of the LIVE™ unit 202, and the second fluid passageway 206b fluidly couples a second servo valve outlet 218b to the second chamber 208b. The servo valve 204 selectively flows tuning fluid through the LIVE™ unit 202 based on a pressure differential between the first chamber 208a and the second chamber 208b. For example, activation of the servo valve 204 simultaneously injects a quantity of tuning fluid from the servo valve 204 into the first chamber 208a via the first fluid passageway 206a and withdraws the same quantity of tuning fluid from the second chamber 208b to the servo valve 204 via the second fluid passageway 206b, or vice versa.

The piston 214 of the LIVE™ unit 202 includes a piston body 216 that extends beyond a periphery of the housing 212. The housing 212 can rigidly attach to a first moving body (e.g., fuselage of a helicopter), and the piston body 216 can rigidly attach to a second moving body (e.g., main rotor gearbox of a helicopter), where the first and second moving bodies can vibrate, displace, or otherwise move relative to each other. In some implementations, the first moving body is more stable relative to the second moving body in that the second moving body includes a more substantial source of movement and/or vibration. The LIVE™ unit 202 can isolate periodic vibration of the second moving body from transmitting to the first moving body (and vice versa) via a force balance in the LIVE™ unit 202 (e.g., oscillatory movement of tuning fluid in the LIVE™ unit). For example, vibratory or oscillatory movement of the second body is transmitted to the piston 214 of the LIVE™ unit 202 causing a pressure differential between the fluid chambers 208a and 208b. In some implementations, the tuning fluid disposed within the LIVE™ unit 202 flows between the fluid chambers 208a and 208b via the tuning port 210 to balance the LIVE™ unit 202. In certain implementations, the servo valve 204 simultaneously injects a quantity of tuning fluid from the servo valve 204 into one of the first chamber 208a or second chamber 208b and withdraws the same quantity of tuning fluid from the other of the first chamber 208a or second chamber 208b to achieve a force balance within the LIVE™ unit. This servo valve 204 injection and withdrawal can occur concurrently with or separately from tuning fluid flowing through the tuning port 210 of the LIVE™ unit. In some implementations, the tuning fluid is a high density and low viscosity fluid that acts as a tuning mass in the LIVE™ unit. For example, many conventional vibration isolators use a fluorinated fluid as the tuning fluid. Fluorinated fluid substantially meets the conventionally desired properties of a tuning fluid, such as having a relatively high density, low viscosity, inertness, non-toxicity, non-corrosiveness, and being non-flammable. The vibration isolation system 200 can use inertia of the tuning fluid within the LIVE™ unit 202 and/or actuation of the servo valve 204 to generate a desired frequency response (e.g., desired frequency, amplitude, and/or phase), such as an isolation frequency of the periodic vibration, between the first and second moving bodies to minimize the transmissibility of vibration across the LIVE™ unit 202 (i.e., from the second moving body to the first moving body).

Figure 3A:
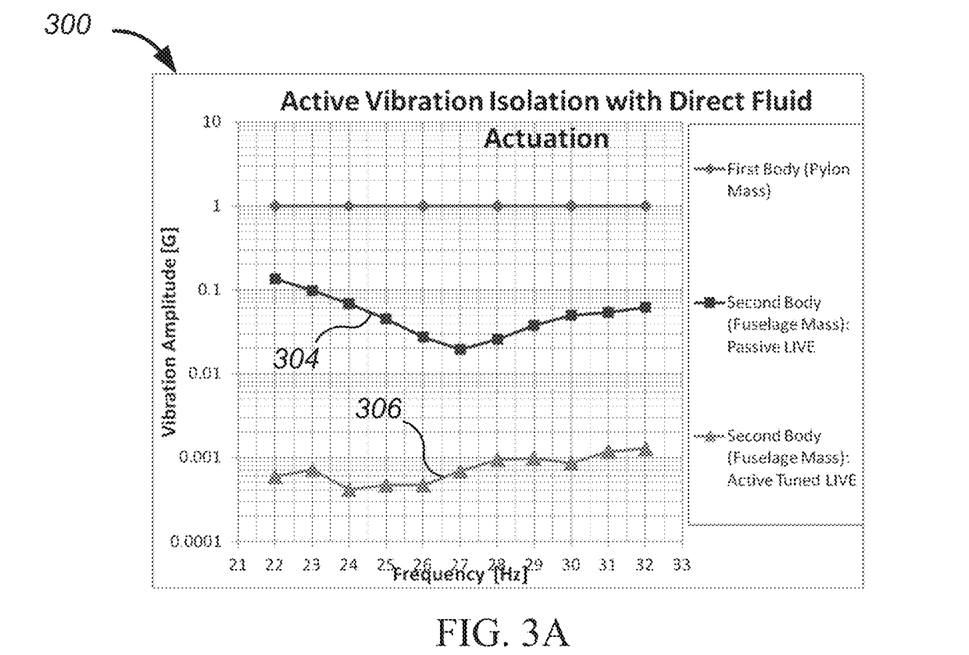
FIGS. 3A-3C are plots showing example vibration responses between two vibrating bodies using a passive vibration isolator and an active vibration isolator.
Figure 3B:
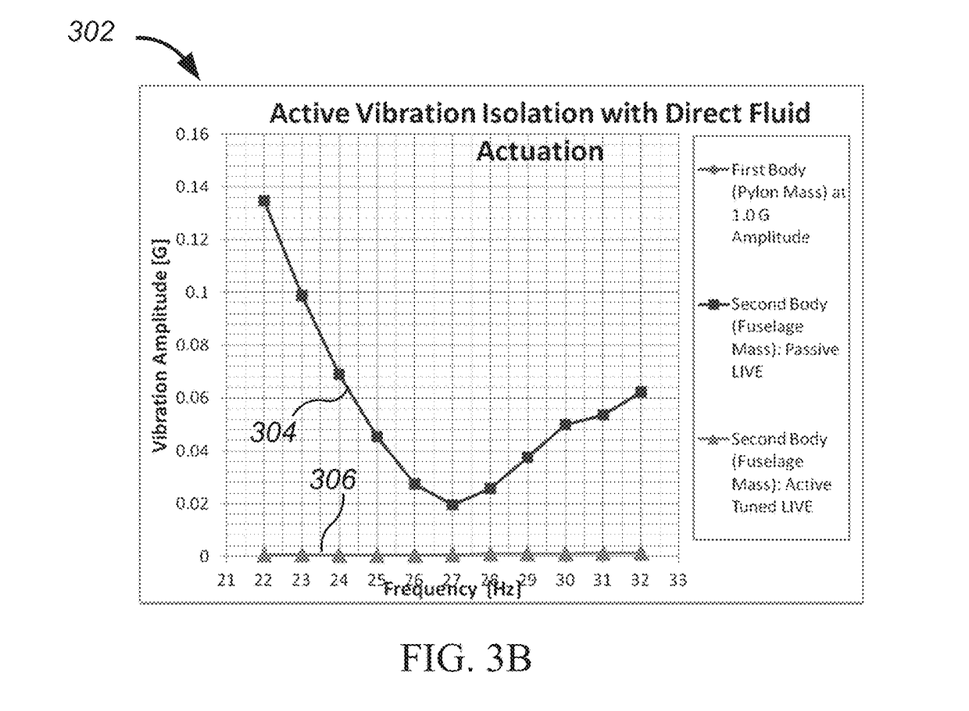

A LIVE™ unit, by itself (e.g., without an active fluid regulator), is a passive device. A passive LIVE™ unit is tuned to be most effective at maximizing isolation at a single periodic vibration frequency. For example, referring to the example LIVE unit 100 of FIG. 1, vibratory force on the LIVE™ unit 100 causes relative movement between the piston 104 and the housing 102. The volumes of the fluid chambers 108a and 108b are alternately increased and decreased as tuning fluid is pumped back and forth by and through the tuning port 110 of the piston 104. The inertia of the tuning fluid is amplified by the ratio of the cross-sectional area of the piston 104 to the cross-sectional area of the tuning port 110 through the piston 104. At some frequency, these inertial forces become substantially equal and opposite to the force of the elastomeric seal and spring member 106 acting on the piston 104 such that cancellation occurs. A passive LIVE™ unit employs acceleration of the tuning fluid and displacement of the elastomeric spring member at the same frequency to produce forces of the same amplitude but opposite phase to reduce vibration between bodies connected by the passive LIVE™ unit. However, active vibration isolation can augment a LIVE™ unit's frequency in order to increase the LIVE™ unit's effectiveness during operation. Referring now to FIG. 2, active augmentation of the servo valve 204 selectively alters the dynamic characteristics of the LIVE™ unit 202, overcoming inherent damping losses within the LIVE™ unit 202. The servo valve 204 actively tunes the LIVE unit 202 by controllably changing the acceleration of the tuning fluid through the inertia track (e.g., tuning port) of the LIVE™ unit 202 to maintain a force balance between elastic forces and inertial forces over a wider range of vibration frequencies. FIGS. 3A and 3B are plots 300 and 302, respectively, showing an example vibration response between two vibrating bodies using a passive LIVE™ unit and an active LIVE™ unit (i.e., an example active vibration isolation system including a LIVE™ unit). Passive curve 304 corresponds to the response of the passive LIVE™ unit, and active curve 306 corresponds to the response of the active LIVE™ unit. In comparing passive curve 304 to active curve 306, the active LIVE™ unit shows improved vibration isolation effective over a larger frequency range as compared to vibration isolation of the passive LIVE™ unit.

Figure 3C:
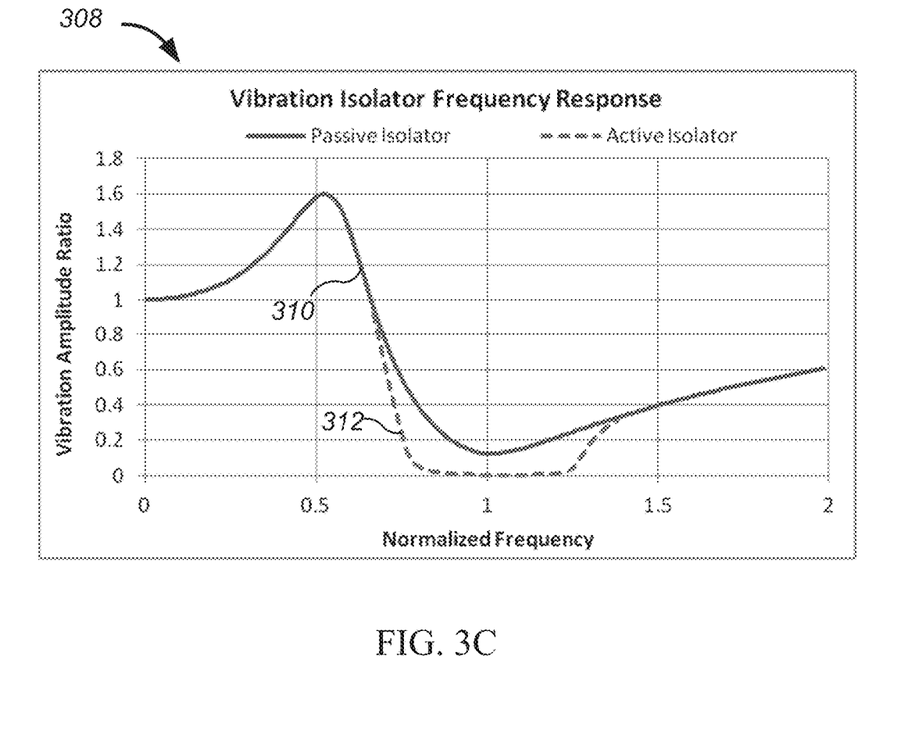

The frequency in which the fluid regulator (e.g., servo valve 204) actively tunes the LIVE™ unit 202 can vary, for example, based on a desired vibration isolation frequency between the two moving bodies. The servo valve 204 tunes the LIVE™ unit 202 to isolate vibration of the moving bodies by selectively altering the frequency response characteristics of the LIVE™ unit 202, for example, to maximize vibration isolation across the LIVE™ unit 202. For example, the servo valve 204 regulates the amplitude and phase of the frequency response of the LIVE™ unit 202 by selectively injecting and withdrawing tuning fluid into and out of the LIVE™ unit 202 in response to vibratory movement of the first moving body, second moving body, or both first and second moving bodies. The servo valve 204 selectively flows tuning fluid to and from the chambers of the LIVE™ unit 202 to reduce, cancel, offset, and/or otherwise address the LIVE™ unit's response to vibrations. In some implementations, a vibration response valley in the LIVE™ unit 202 vibration response can be deepened by canceling damping losses in the LIVE™ unit's vibration response. FIG. 3C is a plot 308 showing an example response curve 310 of an isolated body attached to a passive LIVE™ unit and an example response curve 312 of the isolated body attached to an active LIVE™ unit (i.e., example active vibration isolation system including a LIVE™ unit) over a normalized frequency range. In comparing curve 310 and curve 312, the active LIVE™ unit provides improved vibration response (i.e., deeper vibration response valley) as compared to the vibration response of the passive LIVE™ unit.

Referring back to FIG. 2, actuation of the servo valve 204 can be based, at least in part, on the pressure differential between the fluid chambers 208a and 208b. The pressure differential can be determined in various ways, and actuation of the servo valve 204 can be implemented at various frequencies. In some implementations, the LIVE™ unit 202 includes a pressure sensor in the first fluid chamber 208a and the second fluid chamber 208b, for example, to identify the respective fluid pressures in the fluid chambers 208a and 208b. In certain implementations, the example active vibration isolation system 200 includes movement-based sensors on the first body, the second body, the housing 212 of the LIVE™ unit 202, the piston body 216 of the LIVE™ unit 202, and/or other bodies to identify movement (e.g., vibration, oscillation, displacement, acceleration, and/or other) of the bodies. Relative movements between bodies can correlate to the pressure differential in the LIVE™ unit 202. In some examples, a movement (e.g., acceleration) in the first moving body and a movement (e.g., acceleration) in the second moving body are measured, a difference between the movements is determined, and an estimated pressure differential is determined based on the difference between the movements. In some implementations, relative movements between bodies correlate to substantially instantaneous pressure differentials or future pressure differentials of a LIVE™ unit connected to the bodies. For example, periodic vibration and/or oscillatory movement of some bodies can be analyzed and/or predicted using movement-based sensors such that corresponding pressure differentials in a LIVE™ unit connecting the bodies can be determined for present and/or future time instants. In some instances, the active vibration isolation system 200 is a closed loop active control system with feedback sensors (e.g., pressure sensors, movement-based sensors, and/or other). The isolation system 200 can use data from feedback sensors to better predict, define, and/or react to relative movements of bodies connect to the LIVE™ unit 202, and thus actuate the servo valve 204 accordingly. Servo valve 204 actuation can be implemented at various frequencies. In some implementations, the servo valve 204 is actuated at the same rate (i.e., frequency) as an oscillatory movement of the corresponding moving bodies, an isolation frequency of corresponding moving bodies, at a higher frequency than the isolation frequency (e.g., 4 to 5 times the isolation frequency), or at another frequency for which vibration isolation is desired. For example, in a helicopter implementation, an example vibration isolation system on the helicopter can be actuated at a blade passage frequency (i.e., a main rotor revolutions per minute (RPM) multiplied by the number of rotor blades of the helicopter).

The servo valve 204 of the example vibration isolation system 200 of FIG. 2 is an electro-hydraulic servo valve. The servo valve 204 includes an electric portion 220 (i.e., torque motor and flapper assembly), a hydraulic system 222 of fluid pathways with high pressure inlets and outlets and low pressure inlets and outlets, and a valve portion 224 including a spool 226 within a sleeve 228 of the hydraulic system 222. Some of the inlets and outlets of the hydraulic system 222 are selectively opened and closed based on a location of the spool 226 within the sleeve 228. The hydraulic system 222 can be separated into a first hydraulic chamber 230a and a second hydraulic chamber 230b, each having a high pressure inlet 232a and 232b, respectively, and a relief port 234a and 234b, respectively. The high pressure inlets 232a and 232b receive pressurized tuning fluid, for example, from a pressurized tuning fluid source. The relief ports 234a and 234b exit to a lower pressure tuning fluid chamber. Fluid in the first hydraulic chamber 230a engages with a first end of the spool 226, and fluid in the second hydraulic chamber 230b engages with a second, opposite end of the spool 226. A rotation of a toggle 236 of the electric portion 220 engages a longitudinal member 238 of the toggle 236 with one of the relief ports 234a or 234b, causing a pressure differential between fluid in the first hydraulic chamber 230a and the second hydraulic chamber 230b. The fluid in the first hydraulic chamber 230a and the second hydraulic chamber 230b acts on and moves the spool 226 based on the pressure differential. An outer diameter of the spool 226 seals against the sleeve 228 to restrict fluid infiltration from the first hydraulic chamber 230a and second hydraulic chamber 230b past the spool 226. The spool 226 includes a first outer groove 240a and second outer groove 240b, and high pressure inlets 242 and lower pressure relief outlets 244 are selectively opened and closed to the outer grooves 240a or 240b based on a location of the spool 226. In the example of FIG. 2, the first fluid passageway 206a is fluidly coupled to the first outer groove 240a, and the second fluid passageway 206b is fluidly coupled to the second outer groove 240b. In some implementations, movement of the spool 226 opens one of the fluid passageways 206a or 206b to high pressure tuning fluid (e.g., through high pressure inlet 242) to flow toward the LIVE™ unit 202 and opens the other of the fluid passageways 206a or 206b to a lower pressure (e.g. through lower pressure relief outlet 244) to flow tuning fluid away from the LIVE™ unit 202.

The servo valve 204 regulates the flow of fluid to and from the LIVE™ unit 202, for example, based on an electrical signal to the electric portion 220 of the servo valve 204. In the example servo valve 204 of FIG. 2, coils 246 circling a lateral member 248 of the toggle 236 and housed in the electric portion 220, when electrified (e.g., when current is supplied to the coils 246), can cause a rotation of the toggle 236. Rotation of the toggle 236 can move the longitudinal member 238 of the toggle 236 to engage with one of the relief ports 234a or 234b. In FIG. 2, the longitudinal member 238 is engaged with the first relief port 234a, sealing high pressure tuning fluid from escaping through the first relief port 234a while continuing to allow fluid in the second hydraulic chamber 230b to escape through the second relief port 234b. The pressure differential between fluid in the first hydraulic chamber 230a and the second hydraulic chamber 230b moves the spool 226 to a position that opens the second fluid passageways 206b to flow tuning fluid to the second chamber 208b of the LIVE™ unit and opens the first fluid passageway 206a to flow tuning fluid from the first chamber 208a of the LIVE™ unit. Although FIG. 2 depicts tuning fluid flow from the LIVE™ unit 202 through fluid passageway 206a and to the LIVE™ unit 202 through fluid passageway 206b, the servo valve 204 can regulate tuning fluid flow to be the opposite, to prevent tuning fluid flow into and out of the LIVE™ unit 202, or regulate tuning fluid flow in another way. Additionally, although FIG. 2 shows the fluid regulator as a servo valve 204, the example vibration isolation system 200 can include a different type of fluid regulator, for example, a servojet valve, direct drive valve, rotary direct drive valve, and/or other types of fluid regulation valves.

Figure 4:
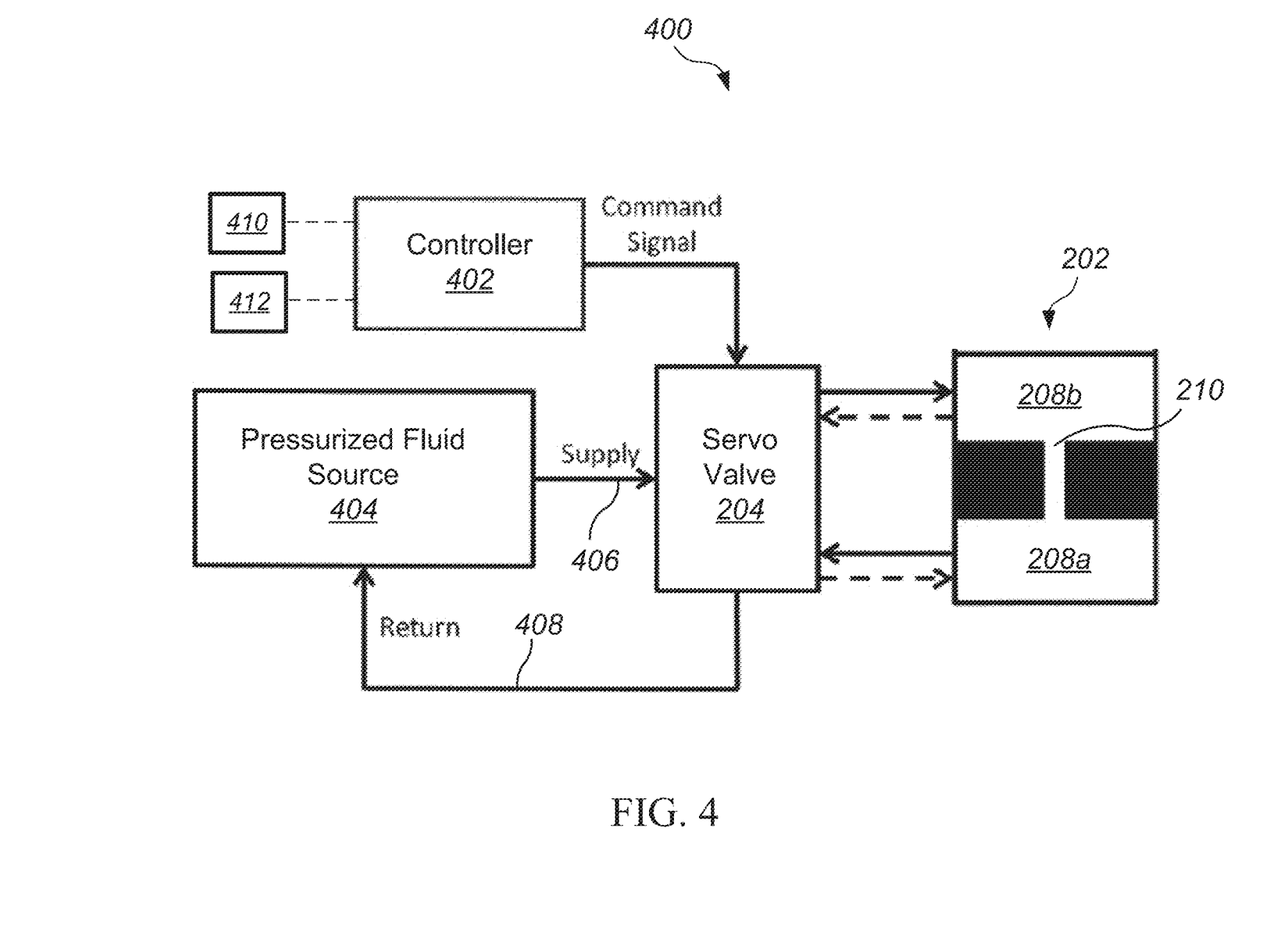
FIGS. 4-7 are schematic diagrams of example systems for isolating body vibrations.

In some implementations, the example vibration isolation system 200 includes a controller connected to the LIVE™ unit 202 and the servo valve 204. For example, FIG. 4 is a schematic diagram of an example system 400 for isolating body vibrations including a controller 402, a pressurized tuning fluid source 404, and the LIVE™ unit 202 and servo valve 204 of FIG. 2. The controller 402 can determine the pressure differential between the first fluid chamber 208a and the second fluid chamber 208b, for example, using pressure sensor data from the pressure sensors 410 in the fluid chambers 208a and 208b of the LIVE™ unit and/or using sensor data from the movement-based sensors 412 on the moving bodies connected to the LIVE™ unit 202. The movement-based sensors 412 can include, for example, tachometers, accelerometers, and/or other movement-based sensors to provide movement data to the controller 402. The controller 402 can determine, or estimate, the pressure differential between the fluid chambers 208a and 208b using the data from the sensors 410 and/or 412. The controller 402 provides a control signal to the servo valve 204 to actuate, and therefore selectively flow tuning fluid through the LIVE™ unit 202 based on the determined, or estimated, pressure differential and desired vibration isolation frequency.

The pressurized tuning fluid source 404 supplies pressurized tuning fluid to the servo valve 204, receives lower pressure tuning fluid from the servo valve 204, and re-pressurizes the tuning fluid returning from the servo valve 204. The tuning fluid source 404 is fluidly coupled to the servo valve 204 via a supply line 406 to supply the pressurized tuning fluid, and fluidly coupled to the servo valve 204 via a return line 408 to receive the lower pressure tuning fluid returning from the servo valve 204.

In some implementations, the tubing sections of the system 400, such as the supply line 406 and the return line 408, include one or more valves in the tubing sections configured to maintain a specified pressure range within the tubing section. For example, the valve van be a pressure sensitive valve, a unidirectional valve, a check valve, or another type of valve to maintain the specified pressure range.

Figure 5:
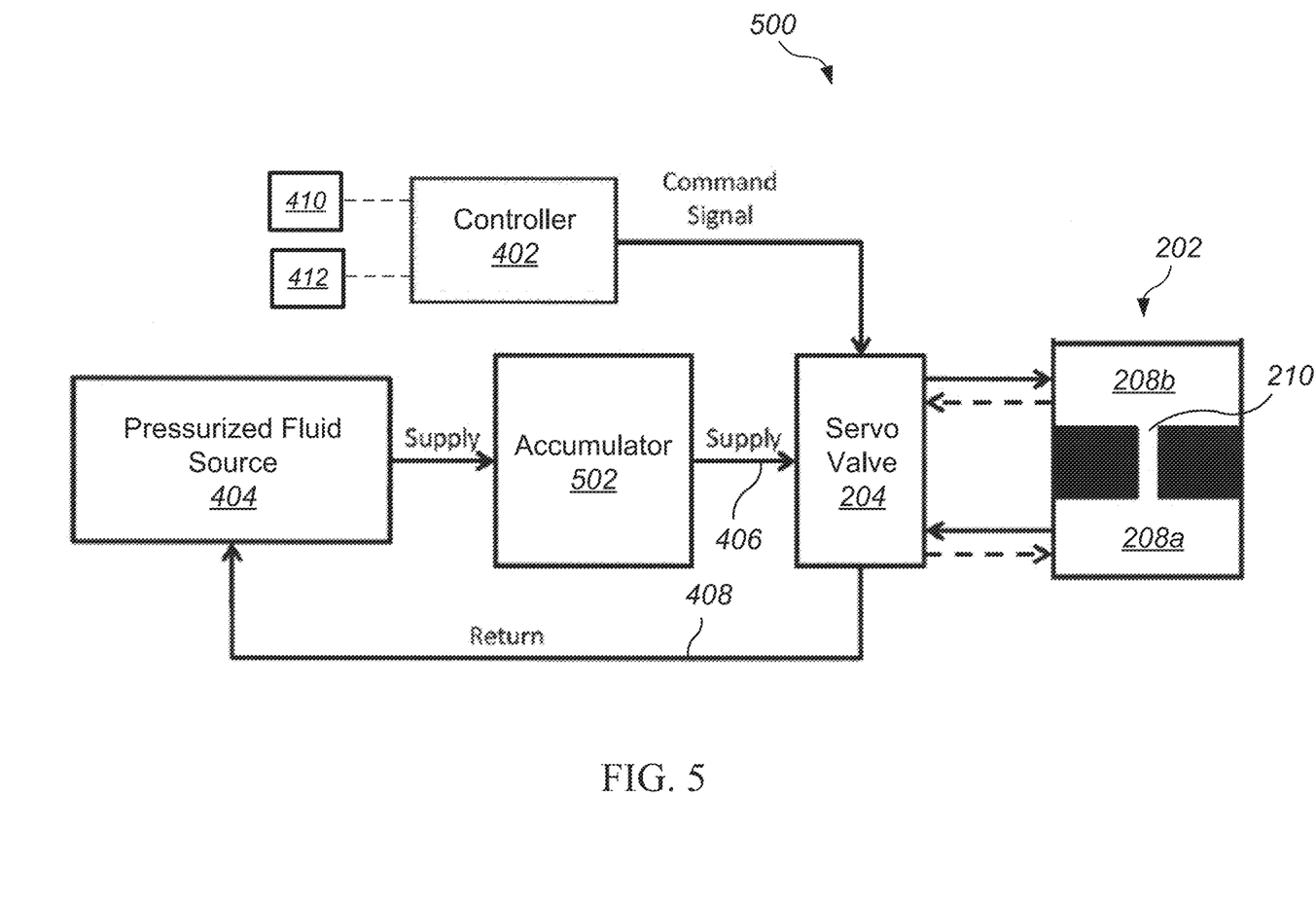

FIG. 5 is a schematic diagram of an example system 500 for isolating body vibrations. The system 500 is like the system 400 of FIG. 4, except the system 500 includes an accumulator 502 along the supply line 406 between the pressurized tuning fluid source 404 and the servo valve 204. The accumulator 502 maintains the tuning fluid at a substantially constant pressure. For example, the accumulator 502 holds the tuning fluid within a certain pressure range to compensate for pressure variations, for example, pressure oscillations that can be associated with the pressure source, pressure variations that result from fluid temperature changes, and/or other pressure variations. The accumulator 502 is configured to provide an adequate volumetric flow of fluid at a substantially steady pressure to the servo valve 204, and therefore the LIVE™ unit 202, throughout a range of operating temperatures (e.g., between −40 degrees Fahrenheit and 140 degrees Fahrenheit).

Figure 6:
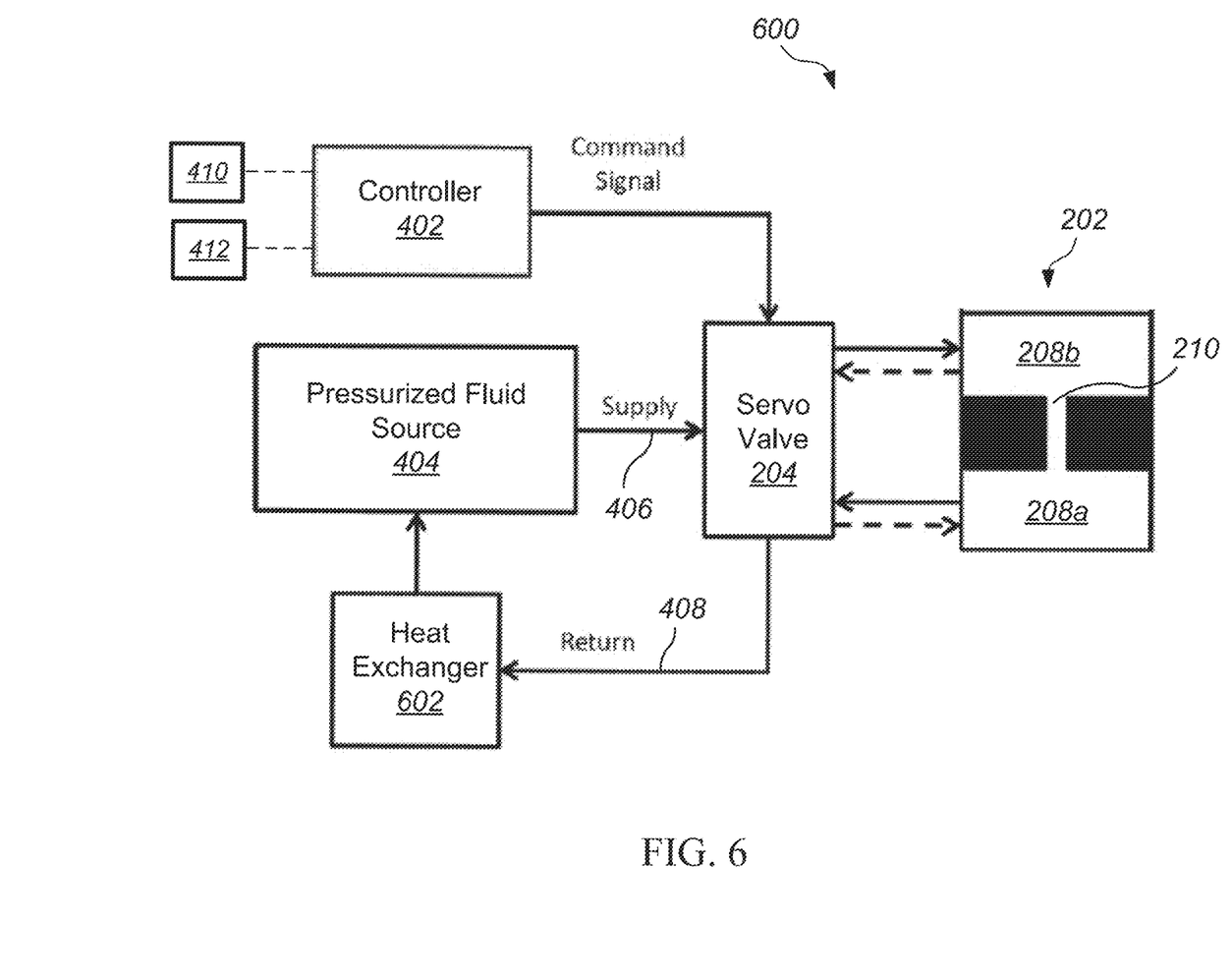

FIG. 6 is a schematic diagram of an example system 600 for isolating body vibrations. The system 600 is like the system 400 of FIG. 4, except the system 600 includes a heat exchanger 602 along the return line 408 between the servo valve 204 and the pressurized tuning fluid source 404. In some implementations, the system fluid pressure changes associated with the fluid pressure source 404, the servo valve 204, and LIVE™ unit 202 can generate heat that elevates the temperature of the fluid. The heat exchanger 602 dissipates heat from the tuning fluid in the return line 408 from the servo valve 204.

Figure 7:
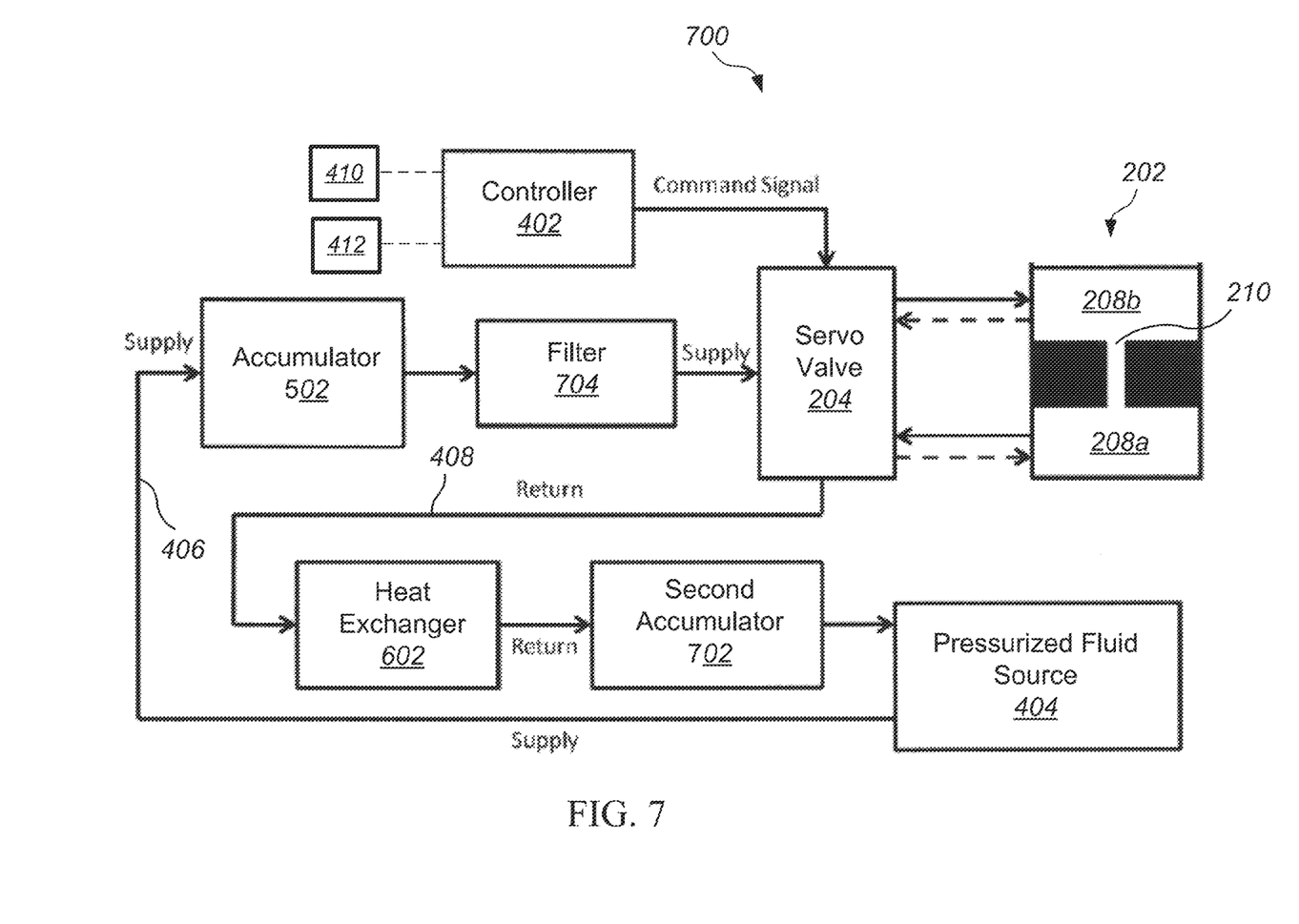

FIG. 7 is a schematic diagram of an example system 700 for isolating body vibrations. The system 700 is like the system 600 of FIG. 6, except the system 700 also includes the accumulator 502 of FIG. 5, a second accumulator 702 along the return line 408 between the heat exchanger 602 and the pressurized tuning fluid source 404, and a filter 704 along the supply line 406 between the accumulator 502 and the servo valve 204. The second accumulator 702 can be configured to collect the lower pressure tuning fluid from the servo valve 204 and supply fluid to the pressurized fluid source 404 at a substantially steady pressure. The filter 704 can filter impurities, small contaminants, and/or other from the tuning fluid that can arise from normal system operation. The filter 704 maintains a clean system fluid, which can extend the service life of the system components.

Figure 8A:
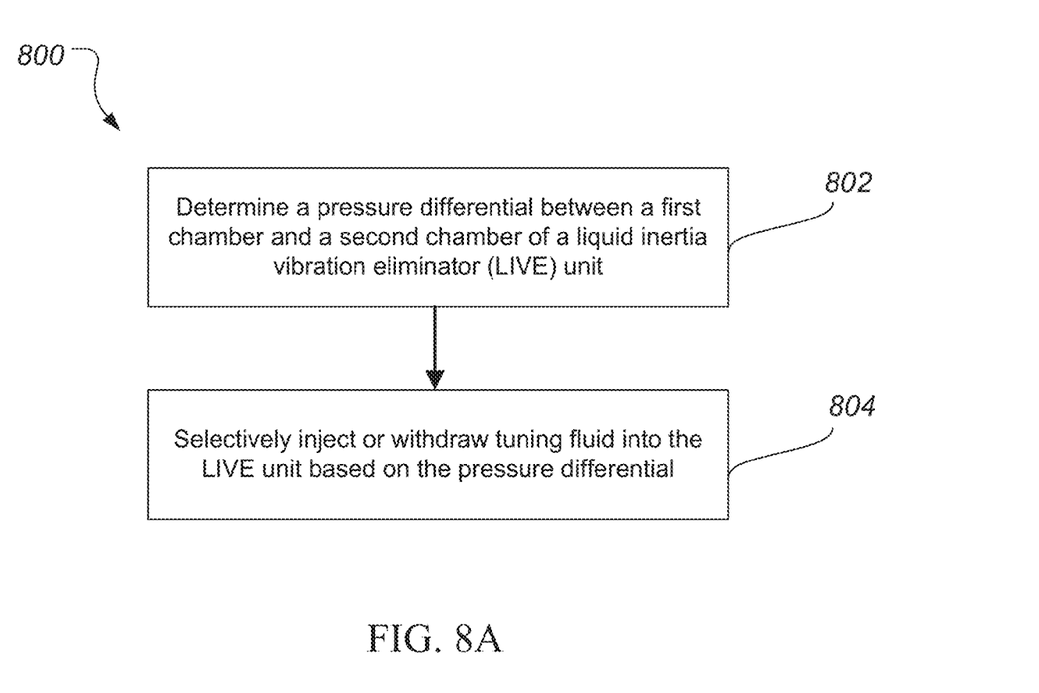
FIG. 8A is a flowchart describing an example method for isolating body vibrations.
Figure 8B:
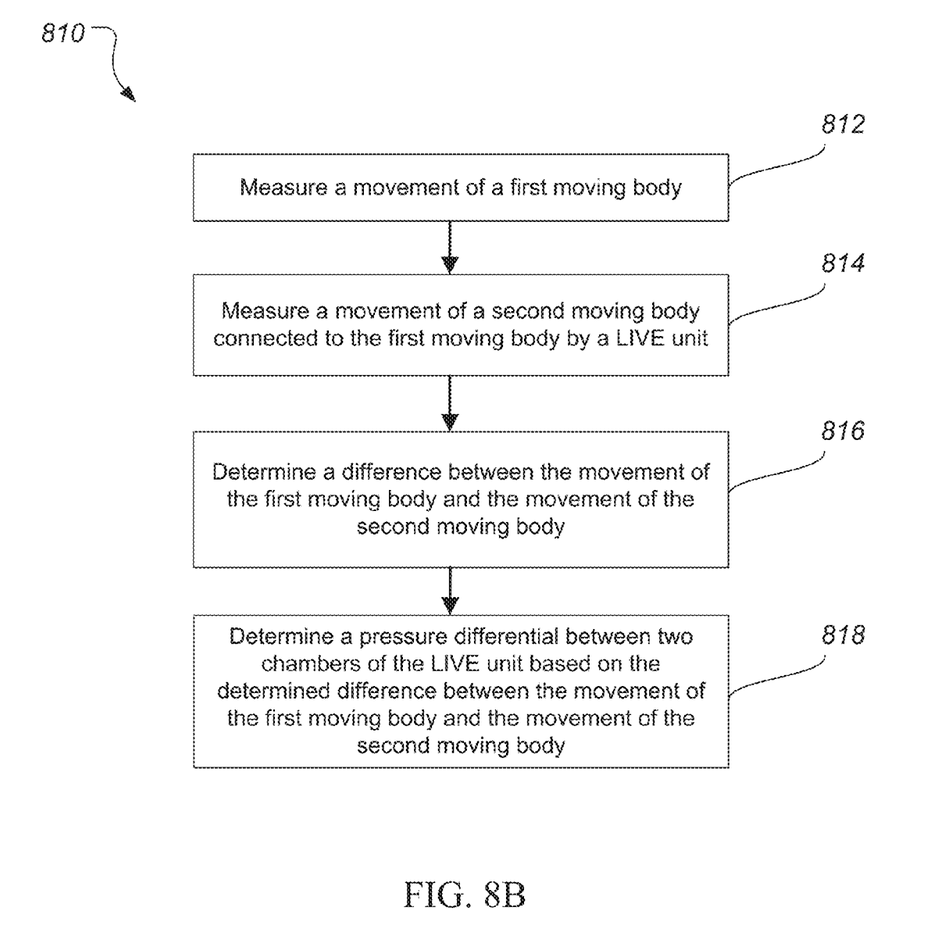
FIG. 8B is a flowchart describing an example method for determining a pressure differential between chambers of a LIVE™ unit.

FIG. 8A is a flow chart describing an example method 800 for isolating body vibrations, for example, performed by the example vibration isolation system 200 of FIG. 2. At 802, a pressure differential between a first chamber and a second chamber of a LIVE™ unit is determined. At 804, tuning fluid is selectively injected into or withdrawn from the LIVE™ unit based on the pressure differential. FIG. 8B is a flow chart describing an example method 810 for determining the pressure differential between the first chamber and the second chamber of the LIVE™ unit, as described at step 802 of FIG. 8A. At 812, a movement of a first moving body is measured. At 814, a movement of a second moving body is measured, where the second moving body is connected to the first moving body by a LIVE™ unit. At 816, a difference between the movement of the first moving body and the movement of the second moving body is determined. At 818, a pressure differential between two chambers of the LIVE™ unit is determined based on the determined difference between the movement of the first moving body and the movement of the second moving body.

Figure 9A:
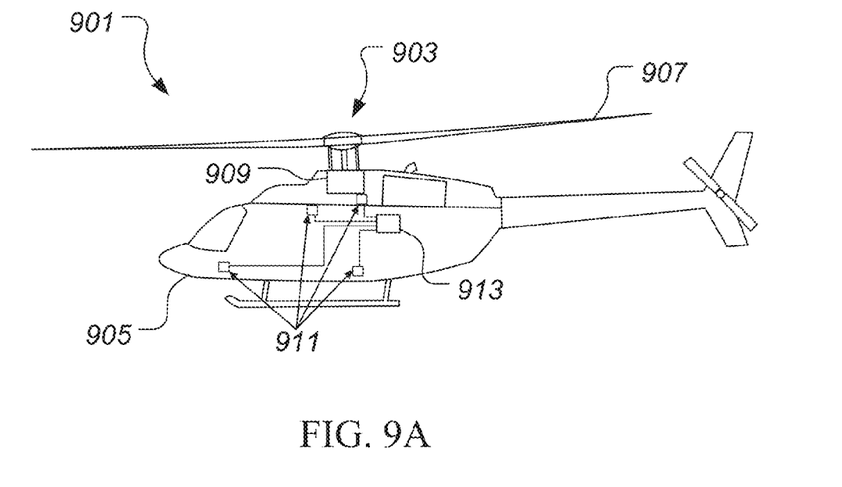
FIG. 9A is a schematic side view of an example helicopter.
Figure 9B:
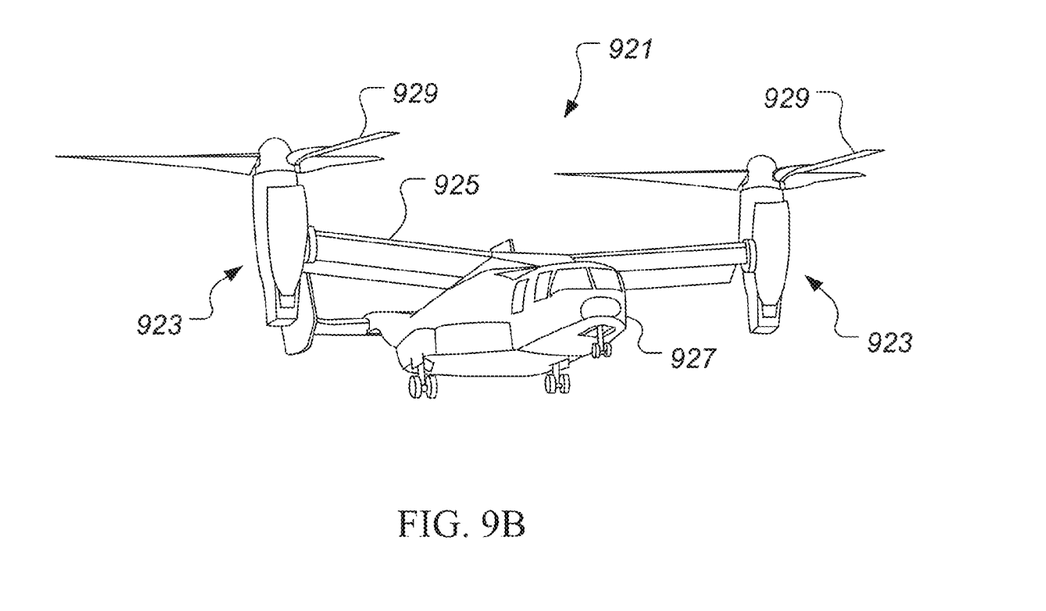
FIG. 9B is a schematic oblique view of an example tiltrotor aircraft.

FIGS. 9A and 9B show an example helicopter 901 and an example tiltrotor aircraft 921, respectively, which can each utilize an active vibration isolation system with direct fluid activation, such as vibration isolation system 200 of FIG. 2, system 400 of FIG. 4, system 500 of FIG. 5, system 600 of FIG. 6, and system 700 of FIG. 7. FIG. 9A is a side view of the example helicopter 901, while FIG. 9B is an oblique view of the example tiltrotor aircraft 921. Helicopter 901 includes a rotor system 903 carried by a fuselage 905. Rotor blades 907 connected to the rotor system 903 provide flight for helicopter 901. The rotor blades 907 are controlled by multiple controllers within a cockpit of the fuselage 905. The pitch of each rotor blade 907 can be manipulated to selectively control direction, thrust, and lift of the helicopter 901. The rotor system 903 connects to the fuselage 905 through a pylon assembly 909 including a transmission that connects to a rotor of the rotor system 903. The pylon assembly can include an active vibration isolation system, for example, for isolating vibration from the rotor system 903 to the fuselage 905. For example, the example helicopter 901 includes sensors 911 (e.g., sensors 410 and/or 412 of FIGS. 4-7) connected to a controller 913 (e.g., controller 402 of FIGS. 4-7) to identify movement in the bodies of the example helicopter 901. The controller 913 can receive and analyze data from the sensors 911 to control the active vibration isolation system.

Tiltrotor aircraft 921 includes two rotary systems 923 carried on a fixed wing 925 attached to a fuselage 927. The rotary systems 923 have multiple proprotors 929 and are carried by rotatable nacelles. The rotatable nacelles provide means for allowing aircraft 921 to take-off and land like a conventional helicopter, and for forward flight like a conventional fixed wing aircraft. The tiltrotor aircraft 921 can include a rotor system mounting assembly that includes an active vibration isolation system, for example, for isolating vibration from the rotor system 923 to the fuselage 927. In some implementations, the example tiltrotor aircraft 921 includes movement-based sensors such as accelerometers, tachometers, and/or other sensors to identify movement in the bodies of the tiltrotor aircraft 921, similar to the sensors 911 of FIG. 9A.

A number of implementations have been described. Nevertheless, it will be understood that various modifications may be made without departing from the spirit and scope of the disclosure.

What is claimed is:

1. A method of isolating vibrations between vibrating bodies, the method comprising:
determining a pressure differential between a first fluid chamber and a second fluid chamber of a liquid inertia vibration eliminator (LIVE) unit, the LIVE unit comprising the first fluid chamber, the second fluid chamber, and a port connecting the first chamber and the second chamber, wherein the first chamber, second chamber, and the connecting port define a volume occupied by a fluid, and the LIVE unit is tuned to a vibration isolation frequency between the vibrating bodies and has one or more frequency response characteristics; and
selectively adjusting the vibration isolating frequency and the one or more frequency response characteristics of the LIVE unit based on the pressure differential using a fluid regulator in fluid communication between the LIVE unit and a fluid source, wherein the fluid regulator selectively injects fluid from the fluid source into one of the fluid chambers of the LIVE unit and simultaneously withdraws and returns fluid from the other fluid chamber of the LIVE unit to the fluid source.

2. The method of claim 1, wherein selectively injecting fluid into and withdrawing fluid from the LIVE unit comprises injecting a quantity of fluid from the fluid source into the first fluid chamber of the LIVE unit based on the pressure differential, and simultaneously withdrawing the same quantity of fluid from the second fluid chamber of the LIVE unit and returning the same quantity of fluid to the fluid source.

3. The method of claim 1, wherein selectively injecting fluid into and withdrawing fluid from the LIVE unit comprises injecting a quantity of fluid from the fluid source into the second fluid chamber of the LIVE unit based on the pressure differential, and simultaneously withdrawing the same quantity of fluid from the first fluid chamber of the LIVE unit and returning the same quantity of fluid to the fluid source.

4. The method of claim 1, wherein selectively injecting fluid into and withdrawing fluid from the LIVE unit is further based on a predetermined time.

5. The method of claim 1, wherein a first portion of the LIVE unit is attached to a first vibrating body, a second portion of the LIVE unit is attached to a second vibrating body, and the first vibrating body is more stable relative to the second vibrating body, and wherein determining the pressure differential between the first fluid chamber and the second fluid chamber comprises:
measuring a movement of the first body;
measuring a movement of the second body;
determining a difference between the movement of the first body and the movement of the second body; and
determining the pressure differential based on the determined difference between the movement of the first moving body and the movement of the second moving body.

6. The method of claim 5, wherein the movement of the first body comprises an acceleration of the first body and the movement of the second body comprises an acceleration of the second moving body.

7. The method of claim 1, further comprising providing a control signal from a controller to the fluid regulator to selectively adjust the vibration isolating frequency and the one or more frequency response characteristics of the LIVE unit.

8. The method of claim 7, wherein a first portion of the LIVE unit is attached to a first vibrating body and a second portion of the LIVE unit is attached to a second vibrating body; and
wherein providing the control signal from the controller to the fluid regulator comprises generating the control signal based on major harmonics of a primary disturbance frequency of the first and second vibrating bodies.

9. The method of claim 7, wherein a first portion of the LIVE unit is attached to a first vibrating body and a second portion of the LIVE unit is attached to a second vibrating body; and
wherein providing the control signal from the controller to the fluid regulator comprises generating the control signal based on a feedback signal output of a sensor connected to at least one of the first vibrating body or the second vibrating body.

10. The method of claim 1, wherein the fluid regulator comprises a servo valve, a direct drive valve, or a rotary direct drive valve, and the fluid source comprises a pressurized fluid source.

11. The method of claim 1, further comprising maintaining the fluid in the fluid source under a constant pressure.

12. The method of claim 11, further comprising receiving, with the fluid source, fluid at a first pressure from the fluid regulator and supplying, with the fluid source, fluid at a second, higher pressure to the fluid regulator.

13. The method of claim 11, further comprising regulating flow of fluid between the fluid source and a second LIVE unit with a second fluid regulator.

14. A system for isolating vibrations between bodies, comprising:
a vibration isolator comprising fluid, wherein the vibration isolator comprises a liquid inertia vibration eliminator (LIVE) unit, the LIVE unit comprising a first fluid chamber, a second fluid chamber, and a port connecting the first chamber and the second chamber, wherein the first chamber, second chamber, and the connecting port define a volume occupied by a fluid, and the LIVE unit is tuned to a vibration isolation frequency between the vibrating bodies and has one or more frequency response characteristics;
a fluid regulator valve in fluid communication with the vibration isolator to selectively flow fluid through the vibration isolator;
a pressurized fluid source in fluid communication with the fluid regulator to supply fluid to the fluid regulator;
a controller in signal communication with the fluid regulator, wherein the controller selectively sends a control signal to the fluid regulator valve that adjusts the vibration isolating frequency and the one or more frequency response characteristics of the LIVE unit based a pressure differential between the first fluid chamber and the second fluid chamber of the LIVE unit;
at least one sensor in signal communication with the controller; and
wherein the fluid regulator, in response to the control signal, selectively injects fluid from the pressurized fluid source into one of the fluid chambers of the LIVE unit and simultaneously withdraws and returns fluid from the other fluid chamber of the LIVE unit to the pressurized fluid source.

15. The system of claim 14, wherein the pressurized fluid source receives fluid at a first pressure from the fluid regulator and supplies fluid at a second, higher pressure to the fluid regulator.

16. The system of claim 14, further comprising a fluid accumulator to maintain the fluid under a constant pressure.

17. The system of claim 14, further comprising a heat exchanger to modify a temperature of the fluid.

18. The system of claim 14, further comprising a second vibration isolator in fluid communication with a second fluid regulator; and
wherein the pressurized fluid source is in fluid communication with the second fluid regulator to supply fluid to the second fluid regulator.

19. The system of claim 18, wherein the at least one sensor comprises a first sensor and a second sensor, the first sensor associated with the first mentioned vibration isolator and in signal communication with the controller, and the second sensor associated with the second vibration isolator and in signal communication with the controller.

20. A system for isolating vibration between bodies, the system comprising:
a fluid source;
a vibration isolator comprising a first chamber, a second chamber, and a port connecting the first chamber and the second chamber, wherein the first chamber, the second chamber and the port define a volume occupied by a fluid, and the vibration isolator is tuned to a vibration isolation frequency between the vibrating bodies and has one or more frequency response characteristics;
a fluid regulator connected to the fluid source and the vibration isolator, wherein the fluid regulator selectively adjusts the vibration isolating frequency and the one or more frequency response characteristics of the vibration isolator based on a pressure differential between the first fluid chamber and the second fluid chamber of the vibration isolator by selectively injecting fluid from the fluid source into one of the fluid chambers of the vibration isolator and simultaneously withdrawing and returning fluid from the other fluid chamber of the vibration isolator to the fluid source.

21. The system of claim 20, comprising fluid passageways between the fluid regulator and the vibration isolator to communicate fluid between the fluid regulator and the first chamber through a first fluid passageway and between the fluid regulator and the second chamber through a second fluid passageway.

22. The system of claim 21, wherein the fluid regulator is configured to inject a quantity of fluid into the first chamber based on the pressure differential and withdraw the same quantity of fluid from the second chamber.

23. The system of claim 21, wherein the fluid regulator is configured to inject a quantity of fluid into the second chamber based on the pressure differential and withdraw the same quantity of fluid from the first chamber.

24. The system of claim 20, further comprising a controller connected to the vibration isolator and the fluid regulator, the controller configured to perform operations comprising:
    determining the pressure differential between the first chamber and the second chamber of the vibration isolator; and
    providing a control signal to the fluid regulator to selectively flow a quantity of the fluid through the vibration isolator based on the pressure differential.

25. The system of claim 24, wherein the vibration isolator comprises a first portion attached to a first moving body and a second portion attached to a second moving body, where the first moving body is more stable relative to the second moving body; and
    wherein determining the pressure differential between the first chamber and the second chamber of the vibration isolator comprises determining the pressure differential between the first chamber and the second chamber at a frequency greater than or equal to a vibration isolation frequency between the first moving body and the second moving body.

26. The system of claim 20, wherein the fluid source comprising tuning fluid under pressure.

27. The system of claim 26, wherein the fluid source is fluidly connected to a second fluid regulator connected to a second vibration isolator.

28. The system of claim 26, further comprising a fluid accumulator fluidly connected to the fluid source and the fluid regulator, the fluid accumulator to maintain the fluid under a constant pressure.

29. The system of claim 28, further comprising a filter connected between the accumulator and the fluid regulator.

30. The system of claim 28, wherein the fluid accumulator is positioned in a supply fluid line connecting the fluid regulator and the fluid source, and further comprising a second fluid accumulator positioned in a return fluid line connecting the fluid regulator and the fluid source.

31. The system of claim 26, further comprising a heat exchanger positioned in a return fluid line connecting the fluid regulator and the fluid source, the heat exchanger to modify a temperature of the fluid flowed from the fluid regulator to the fluid source.

32. The system of claim 20, wherein the vibration isolator comprises a liquid inertia vibration eliminator (LIVE) unit.

33. The system of claim 20, wherein the fluid regulator is selected from the group consisting of a servo valve, a direct drive valve, and a rotary direct drive valve.

* * * * *